(12) United States Patent
Xu

(10) Patent No.: US 10,812,620 B2
(45) Date of Patent: Oct. 20, 2020

(54) HOME GATEWAY AND CONTROL METHOD THEREOF

(71) Applicant: BOE TECHNOLOGY GROUP CO., LTD., Beijing (CN)

(72) Inventor: Lingfeng Xu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/517,519

(22) Filed: Jul. 19, 2019

(65) Prior Publication Data

US 2020/0028937 A1 Jan. 23, 2020

(30) Foreign Application Priority Data

Jul. 20, 2018 (CN) .......................... 2018 1 0803298

(51) Int. Cl.
*H04L 29/08* (2006.01)
*G06F 9/50* (2006.01)
(Continued)

(52) U.S. Cl.
CPC .......... *H04L 67/322* (2013.01); *G06F 9/5061* (2013.01); *H04L 12/66* (2013.01);
(Continued)

(58) Field of Classification Search
CPC ..... H04L 67/322; H04L 12/66; H04L 49/901; H04L 67/125; H04L 69/22; G06F 9/5061
See application file for complete search history.

(56) References Cited

U.S. PATENT DOCUMENTS 4,423,414 A * 12/1983 Bryant .................... H04L 29/00
370/257
6,505,255 B1 * 1/2003 Akatsu .................... H04L 12/66
370/351
(Continued)

FOREIGN PATENT DOCUMENTS

CN 105007205 A 10/2015
CN 105721831 A 6/2016
(Continued)

OTHER PUBLICATIONS

First Chinese Office Action issued in corresponding Chinese Application No. 201810803298.8, dated Jul. 28, 2020, with English language translation.

*Primary Examiner* — Jerry B Dennison
(74) *Attorney, Agent, or Firm* — McDermott Will & Emery LLP

(57) ABSTRACT

A control method of a home gateway includes: receiving a cloud control command, identifying a manufacturer code and a communication protocol of an terminal device to be controlled from the cloud control command, selecting a target child process from a plurality of child processes, writing the cloud control command to a communication message queue corresponding to the target child process according to the communication protocol of the terminal device to be controlled; extracting the cloud control command, determining a first target communication interface coupled with the terminal device to be controlled, and controlling the terminal device to be controlled through the first target communication interface.

16 Claims, 5 Drawing Sheets

(51) Int. Cl.
*H04L 12/66* (2006.01)
*H04L 12/879* (2013.01)
*H04L 29/06* (2006.01)

(52) U.S. Cl.
CPC .......... *H04L 49/901* (2013.01); *H04L 67/125* (2013.01); *H04L 69/22* (2013.01)

(56) References Cited

U.S. PATENT DOCUMENTS

| | | | |
|---|---|---|---|
| 9,686,094 B2* | 6/2017 | Kim | H04L 12/2818 |
| 9,948,510 B2* | 4/2018 | Kim | H04L 12/2825 |
| 10,091,141 B2* | 10/2018 | Yun | H04L 51/02 |
| 10,097,472 B2* | 10/2018 | Dowlatkhah | H04L 45/302 |
| 10,178,206 B2* | 1/2019 | Tessiore | H04L 69/18 |
| 2009/0072991 A1* | 3/2009 | Hayashi | H04L 12/282 |
| | | | 340/11.1 |
| 2010/0070614 A1* | 3/2010 | Keum | G06F 15/163 |
| | | | 709/219 |
| 2013/0159490 A1* | 6/2013 | Huh | H04L 12/2836 |
| | | | 709/223 |
| 2014/0343698 A1* | 11/2014 | Kakuta | H02J 13/00004 |
| | | | 700/90 |
| 2015/0349975 A1* | 12/2015 | Hu | H04L 67/12 |
| | | | 709/223 |
| 2017/0005817 A1* | 1/2017 | Gould | H04L 12/2825 |
| 2018/0232328 A1 | 8/2018 | Lassen et al. | |
| 2020/0028937 A1* | 1/2020 | Xu | H04L 67/322 |

FOREIGN PATENT DOCUMENTS

| | | |
|---|---|---|
| CN | 107493211 A | 12/2017 |
| CN | 110462599 A | 11/2019 |

\* cited by examiner

| Message type | Message length | Message body | | |
|---|---|---|---|---|
| | | Address | Command | Data |
| mtype | mlength | addr | cmd | data |

| Device type | Device address | Command data |
|---|---|---|
| DeviceType | DeviceAddress | DeviceCommand |

HOME GATEWAY AND CONTROL METHOD THEREOF

CROSS-REFERENCE TO RELATED APPLICATION

This application claims priority to Chinese Patent Application No. 201810803298.8, filed with the Chinese Patent Office on Jul. 20, 2018, titled "SMART HOME GATEWAY AND CONTROL METHOD THEREOF", which is incorporated herein by reference in its entirety.

TECHNICAL FIELD

The present disclosure relates to the field of smart home technologies, and in particular, to an home gateway and a control method thereof.

BACKGROUND

With the development of the Internet of Things, a use of smart homes in main places of home life has gradually become popular. The smart homes are designed to provide a more comfortable, convenient and efficient home environment for people. The smart homes have entered a relatively fast stage of development in technology.

SUMMARY

In one aspect, a control method of an home gateway is provided. The control method includes: executing a master process to: receive a cloud control command, and identify a manufacturer code and a communication protocol of an terminal device to be controlled from the cloud control command; select a target child process from a plurality of child processes, wherein the plurality of child processes corresponds to a plurality of types of manufacturer information, each type of manufacturer information corresponds to at least one terminal device and includes at least a manufacturer code, each child process corresponds to a communication message queue, and a manufacturer code in manufacturer information corresponding to the target child process is the same as the manufacturer code of the terminal device to be controlled; and write the cloud control command into a communication message queue corresponding to the target child process according to the communication protocol of the terminal device to be controlled. The control method further includes: executing the target child process to: extract the cloud control command from the communication message queue corresponding to the target child process, determine a first target communication interface coupled with the terminal device to be controlled according to the cloud control command, and control the terminal device to be controlled through the first target communication interface.

In some embodiments, before receiving a cloud control command, the control method further includes: executing the master process to: obtain the plurality of types of manufacturer information; create the plurality of child processes correspondingly according to the plurality of types of manufacturer information, and create a communication message queue for each child process.

In some embodiments, creating the plurality of child processes includes: creating the plurality of child processes according to manufacturer codes of the plurality of types of manufacturer information. The plurality of child processes are in one-to-one correspondence with the plurality of types of manufacturer information. Alternatively, each type of manufacturer information further includes a communication protocol, and creating the plurality of child processes includes: creating the plurality of child processes according to the manufacturer codes and communication protocols of the plurality of types of manufacturer information, wherein each child process corresponds to a manufacturer code and a communication protocol, and manufacturer codes of any two child processes are different, or communication protocols of any two child processes are different, or manufacturer codes of any two child processes are different and communication protocols of the two child processes are different.

In some embodiments, in a case where the plurality of child processes are created according to the manufacturer codes and communication protocols of the plurality of types of manufacturer information, a communication protocol corresponding to the target child process is the same as the communication protocol of the terminal device to be controlled.

In some embodiments, each communication interface is capable of being coupled with at least one terminal device, and each communication interface corresponds to at least one type of communication protocol. Determining the first target communication interface coupled with the terminal device to be controlled according to the cloud control command, includes: selecting the first target communication interface from a plurality of communication interfaces, according to the communication protocol of the terminal device to be controlled included in the cloud controlling command, wherein one of at least one type of communication protocol corresponding to the first target communication interface is the same as the communication protocol of the terminal device to be controlled; and sending the cloud control command to the first target communication interface according to the communication protocol of the terminal device to be controlled.

In some embodiments, each type of manufacturer information further includes a communication protocol. the control method further includes: executing the master process, to: create a protocol configuration file according to the plurality of communication interfaces and communication protocols in the plurality of types of manufacturer information; and create a plurality of interface message queues corresponding to the plurality of communication interfaces according to the protocol configuration file. Sending the cloud control command to the first target communication interface according to the communication protocol of the terminal device to be controlled, includes: setting an interface message queue corresponding to the first target communication interface as a target message queue, and writing the cloud control command into the target message queue according to the communication protocol of the terminal device to be controlled; and parsing the cloud control command from the target message queue to the first target communication interface.

In some embodiments, the cloud control command includes at least two types of functional instructions; and extracting the cloud control command from the communication message queue, includes: decoding the cloud control command, separating the at least two types of functional instructions in the cloud control command to a priority queue according to an order of a priority from high to low, and processing each type of functional instruction according to the priority queue.

In some embodiments, each type of functional instruction includes an add instruction, a delete instruction, or a control instruction. A priority of the add instruction is higher than a priority of the delete instruction, and the priority of the delete instruction is higher than a priority of the control instruction.

In another aspect, a control method of a home gateway is provided. In the home gateway, each of a plurality of communication interfaces is capable of being coupled with at least one terminal device, and each communication interface corresponds to one interface message queue. The plurality of communication interfaces are all coupled with at least one processor. The at least one processor includes a circular buffer, and the circular buffer includes a head pointer corresponding to a frame header of a data frame and a dynamic tail pointer corresponding to the head pointer. A storage length of the circular buffer is greater than a maximum storage length allowed to be stored between the head pointer and the dynamic tail pointer. the control method of the home gateway, includes: receiving, by a second target communication interface, data from at least one terminal device coupled with the second target communication interface; reading, by the at least one processor, the data from the second target communication interface, storing, by the at least one processor, the data in the circular buffer, wherein a portion of the data corresponding to a frame header of a data frame is stored in a position of the circular buffer pointed to by the head pointer, and with a movement of the dynamic tail pointer, a portion of the data corresponding to a data portion of the data frame and a portion of the data corresponding to a frame end of the data frame are stored in a position of the circular buffer pointed to by the dynamic tail pointer in sequence according to a reading order; and once data stored between the head pointer and the dynamic tail pointer is greater than or equal to data of one data frame, parsing, by the at least one processor, the data from the location pointed to by the head pointer, and the parsed data is added into an interface message queue corresponding to the second target communication interface, so that the at least one processor extracts the parsed data from the interface message queue.

In some embodiments, the controlling method further includes: updating, by the at least one processor, a position of the head pointer and a position of the dynamic tail pointer in the circular buffer after the at least one processor parses the data stored between the head pointer and the dynamic tail pointer, and parsing, by the at least one processor, a next data frame according to the head pointer, the position of which is updated.

In yet another aspect, a home gateway is provided. The home gateway includes a plurality of communication interfaces and at least one processor coupled with the plurality of communication interfaces. Each communication interface is configured to be coupled with at least one terminal device. The at least one processor is configured to: receive a cloud control command, and identify a manufacturer code and a communication protocol of a terminal device to be controlled from the cloud control command; select a target child process from the plurality of child processes, wherein the plurality of child processes corresponds to a plurality of types of manufacturer information, each type of manufacturer information corresponds to at least one terminal device and includes at least a manufacturer code, each child process corresponding to a communication message queue, and a manufacturer code in manufacturer information corresponding to the target child process is the same as the manufacturer code of the terminal device to be controlled; and write the cloud control command to a communication message queue corresponding to the target child process according to the communication protocol of the terminal device to be controlled; and extract the cloud control command from the communication message queue; determine a first target communication interface coupled with the terminal device to be controlled according to the cloud control command; and control the terminal device to be controlled through the first target communication interface.

In some embodiments, the at least one processor is further configured to: obtain the plurality of types of manufacturer information; create the plurality of child processes correspondingly according to the plurality of types of manufacturer information; and create a communication message queue for each child process.

In some embodiments, each communication interface corresponds to at least one type of communication protocol, and each type of manufacturer information further includes a communication protocol. The at least one processor is further configured to: create a protocol configuration file according to the plurality of communication interfaces and communication protocols in the plurality of types of manufacturer information; create a plurality of interface message queues corresponding to the plurality of communication interfaces according to the protocol configuration file; and determine the first target communication interface, and transmit the cloud control command to the first target communication interface.

In some embodiments, the home gateway further includes a memory. The memory is coupled with the at least one processor, and the memory is configured to store a plurality of communication message queues and the plurality of interface message queues.

In some embodiments, the at least one processor includes a circular buffer, and the circular buffer includes a head pointer corresponding to a frame header of a data frame and a dynamic tail pointer corresponding to the head pointer. A storage length of the circular buffer is greater than a maximum storage length allowed to be stored between the head pointer and the dynamic tail pointer. The at least one processor is further configured to read data from a second target communication interface, and store the data in the circular buffer. The second target communication interface is a communication interface coupled with any terminal device that reports the data. A portion of the data corresponding to the frame header of a data frame is stored in a position of the circular buffer pointed to by the head pointer, and with a movement of the dynamic tail pointer, a portion of the data corresponding to a data portion of the data frame and a portion of the data corresponding to a frame end of the data frame are stored to a position of the circular buffer pointed to by the dynamic tail pointer in sequence, according to a reading order. The at least one processor is further configured to: once data stored between the head pointer and the dynamic tail pointer is greater than or equal to data of one data frame, start parsing the data from the position of the circular buffer pointed to by the head pointer, and add the parsed data into an interface message queue corresponding to the second target communication interface, so that the at least one processor extracts the parsed data from the interface message queue.

In yet another aspect, a non-transitory computer-readable storage medium storing executable instructions that, when executed by a home gateway, cause the home gateway to perform the control method of the home gateway described above.

BRIEF DESCRIPTION OF THE DRAWINGS

The accompanying drawings described herein are intended to provide a further understanding of some embodiments of the present disclosure and constitute a part of embodiments of the present disclosure. The illustrative embodiments of the present disclosure and the description thereof serve to explain the present disclosure, but do not constitute an undue limitation of the present disclosure. In the accompanying drawings.

DETAILED DESCRIPTION

Figure 1:
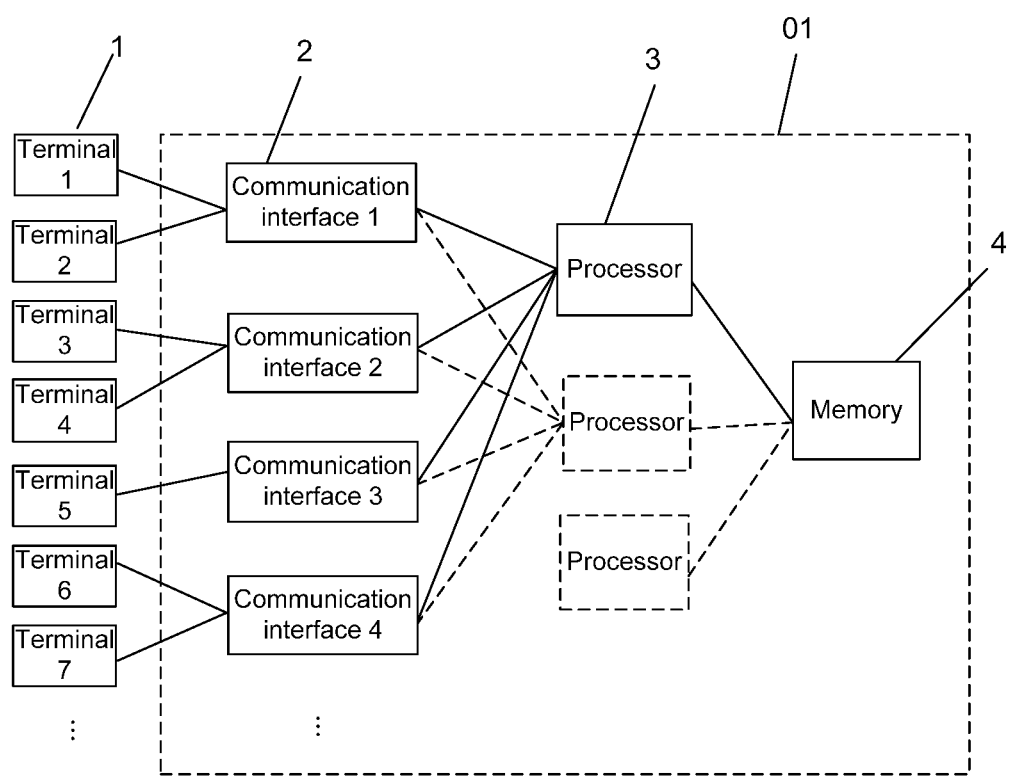
FIG. 1 is a schematic diagram showing a structure of a home gateway, in accordance with some embodiments.

The technical solutions in embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

In the description of some embodiments of the present disclosure, term "plurality" means two or more unless otherwise specified. Term "and/or" is only described a relationship of association objects, which represents three relationships, for example, "A and/or B" represents three conditions: A exists alone, A and B exist simultaneously, and B exists alone. Terms "first" and "second" are used to distinguish between same or similar items whose functions and effects are substantially the same. A person skilled in the art will understand that the terms "first" and "second" are not intended to limit a quantity and order of execution of the items, and do not limit a difference among the items.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled" may also refer to "communicatively coupled", which means that two or more elements are not in direct contact with each other, but yet still co-operate or interact with each other. The embodiments disclosed herein are not necessarily limited in this context.

Herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

At present, terminal devices accessed to a same smart home environment may correspond to different manufacturers, and adopt different types of communication protocols, such as a ZigBee protocol, a Z-Wave protocol, a Bluetooth transmission protocol, or a wireless fidelity transmission protocol (Wi-Fi transmission protocol). Due to a large difference in the communication protocols of the terminal devices, it is hard to simultaneously control the terminal devices in the same smart home environment.

Based on this, in a case where the terminal devices adopting different communication protocols from different manufacturers are uniformly controlled by a home gateway, the home gateway usually reclassifies, in a device management control layer, terminal devices that are more commonly used in the smart home environment according to their functions. In addition, according to classified categories, the home gateway abstractly integrates, in a device abstraction layer, device types and control methods of the terminal devices in respective categories. Then, the home gateway uniformly encapsulates, in a communication protocol layer, corresponding device data and control data after the abstract integration, so that the home gateway uniformly controls, in an application layer, each terminal device according to the encapsulated device data and control data.

However, in the related art, data is processed through the vertical layered integration method described above, that is, data is processed in the device management control layer, the device abstraction layer, and the communication protocol layer, and thus a large amount of data coupling is required, which may easily lead to an excessive workload of the home gateway, which is disadvantageous for further increasing settings of the terminal devices, and is disadvantageous for program developments and maintenances of control applications of terminal devices added.

With reference to FIG. 1, some embodiments of the present disclosure provide a home gateway 01, and the home gateway 01 includes a plurality of communication interfaces 2 and at least one processor 3 coupled with the plurality of communication interfaces 2. Each communication interface 2 is configured to be coupled with at least one terminal device 1. For example, the communication interface 2 may be communicated with the at least one terminal device 1 by using a wired or wireless connection. The following embodiments are illustrated by taking the at least one processor 3 including a single processor 3 as an example, and the situation of the at least one processor 3 that includes a plurality of processors 3 may refer to the situation of the single processor 3.

Figure 2:
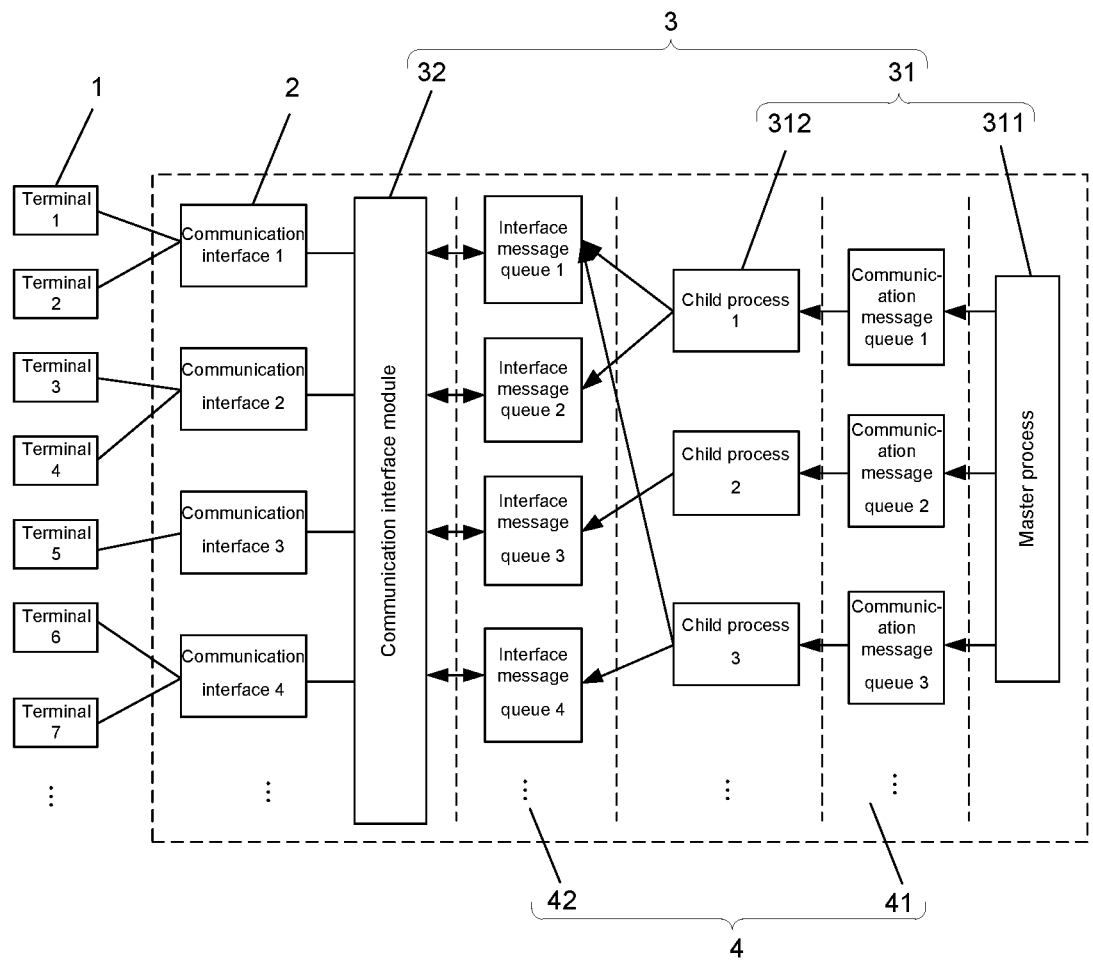
FIG. 2 is a schematic diagram showing a structure of another home gateway, in accordance with some embodiments.

For the convenience of describing embodiments of the present disclosure, as shown in FIG. 2, the processor 3 is described to include a communication interface module 32 coupled with the plurality of communication interface 2, and an application processing module 31 coupled with the communication interface module 32.

The terminal devices 1, as smart home devices used in a smart home environment, include various types of sensors provided in apparatus such as household electric appliances, lighting switches, sockets, doors, windows, or security and protection monitoring equipment. Terminal devices 1 used in the smart home environment may adopt different types of communication protocols such as the ZigBee protocol, the Z-Wave protocol, the Bluetooth transmission protocol, the infrared transmission protocol or the Wi-Fi transmission protocol.

The communication interface 2, as a peripheral communication interface of the home gateway, includes a universal serial bus (USB) interface, a serial communication interface (SCI), a serial peripheral interface (SPI), or an inter-integrated circuit (IIC) interface. In some embodiments, the home gateway is provided with a Linux system. In some embodiments, the home gateway is capable of being coupled with at least one character device, such as a keyboard and a printer, according to the types of the communication interfaces 2.

As shown in FIG. 2, in some embodiments, the application processing module 31 is configured to perform a master process 311 to: obtain a plurality of types of manufacturer information, each of which corresponds to at least one terminal device 1 and includes at least a manufacturer code; create a plurality of child processes 312 corresponding to the plurality of types of manufacturer information; and create a communication message queue 41 for each child process 312.

In some embodiments, the application processing module 31 is further configured to perform the master process 311 to: receive a cloud control command; identify a manufacturer code and a communication protocol of a terminal device to be controlled from the cloud control command; select a child process, which corresponds to manufacturer information including a manufacturer code the same as the manufacturer code of the terminal device to be controlled, as a target child process; and write the cloud control command to a communication message queue 41 corresponding to the target child process according to the communication protocol of the terminal device to be controlled.

In addition, the application processing module 31 is further configured to perform the target child process 312 to: extract the cloud control command from the communication message queue; determine a first target communication interface coupled with the terminal device to be controlled according to the cloud control command; and control the terminal device to be controlled through the first target communication interface.

Each communication interface 2 is capable of being coupled with at least one terminal device 1, and each communication interface 2 corresponds to at least one type of communication protocol. In some embodiments, the application processing module 31 is further configured to create a protocol configuration file according to the plurality of communication interfaces 2 and communication protocols in the plurality of types of manufacturer information. The communication interface module 32 is configured to create a plurality of interface message queues 42 corresponding to the plurality of communication interfaces 2 according to the protocol configuration file. The application processing module 31 is further configured to determine the first target communication interface through the communication interface module 32, and transmit the cloud control command to the first target communication interface.

In some embodiments, the communication interface module 32 includes a circular buffer 33, so as to ensure that data received from each terminal device 1 may be reliably processed.

Figures 3, 4, 5:
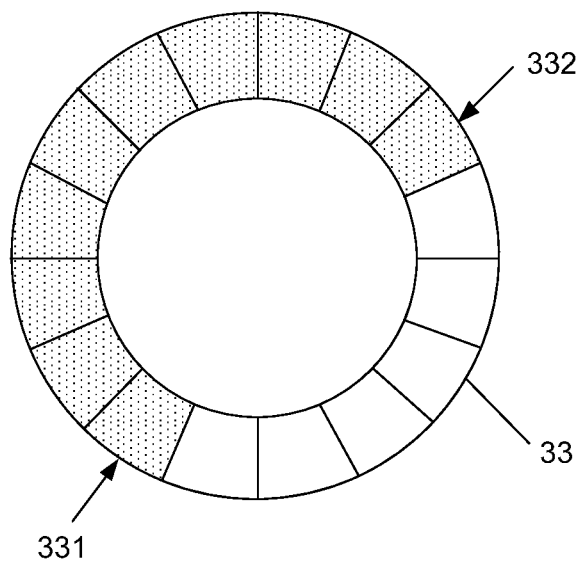
FIG. 3 is a schematic diagram showing a structure of a circular buffer, in accordance with some embodiments.
FIG. 4 is a schematic diagram showing a data structure of an interface message queue, in accordance with some embodiments.
FIG. 5 is a schematic diagram showing a data structure of a cloud control command, in accordance with some embodiments.

For example, as shown in FIG. 3, the circular buffer 33 includes a head pointer 331 corresponding to a frame header of a data frame and a dynamic tail pointer 332 corresponding to the head pointer 331. A storage length of the circular buffer 33 is greater than a maximum storage length allowed to be stored between the head pointer 331 and the dynamic tail pointer 332. For example, the communication interface module 32 is a data frame processing module.

In some embodiments, the communication interface module 32 is further configured to read data from the second target communication interface, and store the data in the circular buffer 33. The second target communication interface is a communication interface 2 coupled with any terminal device 1 that reports the data. A portion of the data corresponding to the frame header of a data frame is stored in a position of the circuit buffer 33 pointed to by the head pointer 331. With a movement of the dynamic tail pointer, a portion of the data corresponding to a data portion of the data frame and a portion of the data corresponding to a frame end of the data frame are stored to a position of the circular buffer 33 pointed to by the dynamic tail pointer in sequence, according to a reading order.

The communication interface module 32 is further configured to: once data stored between the head pointer and the dynamic tail pointer is greater than or equal to data of one data frame, start parsing the data from the position of the circular buffer pointed to by the head pointer, and add the parsed data in to an interface message queue corresponding to the second target communication interface, so that the application processing module 31 may extract the parsed data from the interface message queue In some embodiments, the communication message queues 41 and the interface message queues 42 are stored in an internal storage space of the processor 3. In some embodiments, as shown in FIG. 1, the home gateway 01 further includes a memory 4 coupled with the processor 3, that is, coupled with the communication interface module 32 and the application processing module 31, and the communication message queues 41 and the interface message queues 42 are stored in the memory 4.

Figure 6:
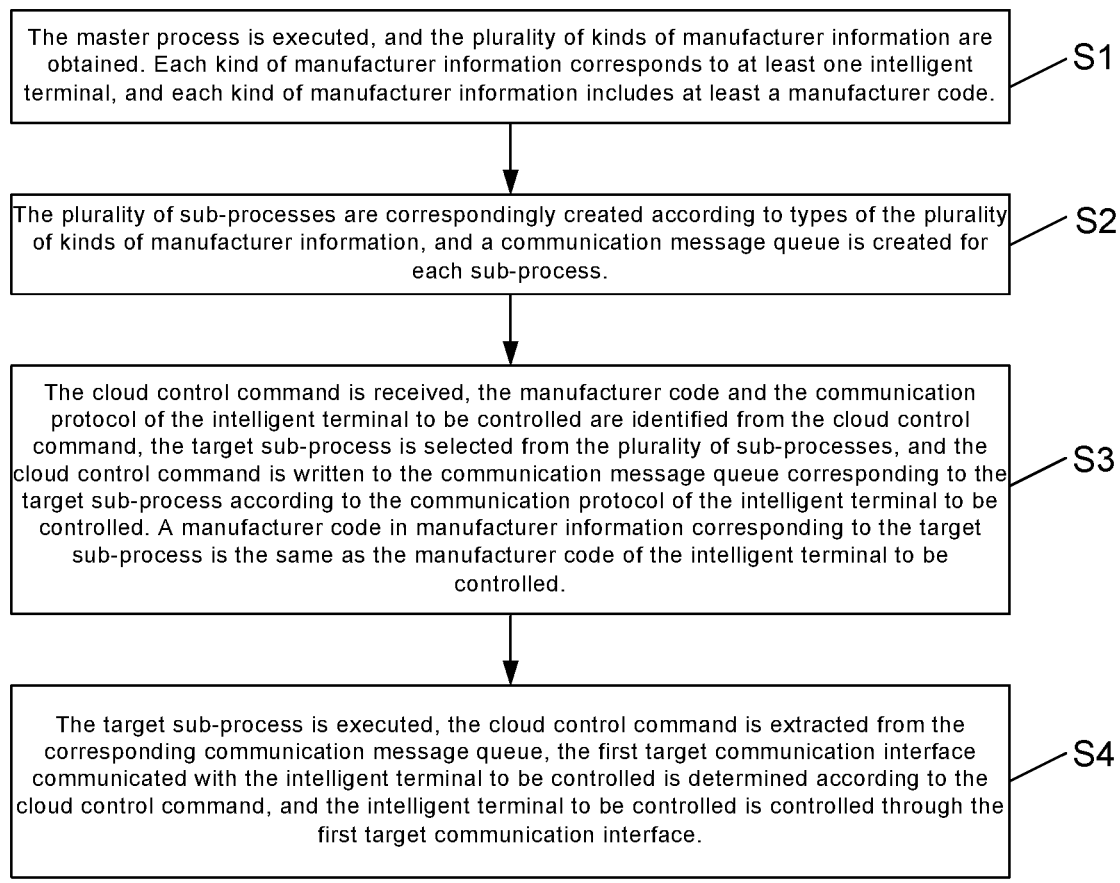
FIG. 6 is a flow diagram of a control method of a home gateway, in accordance with some embodiments.
Figure 7:
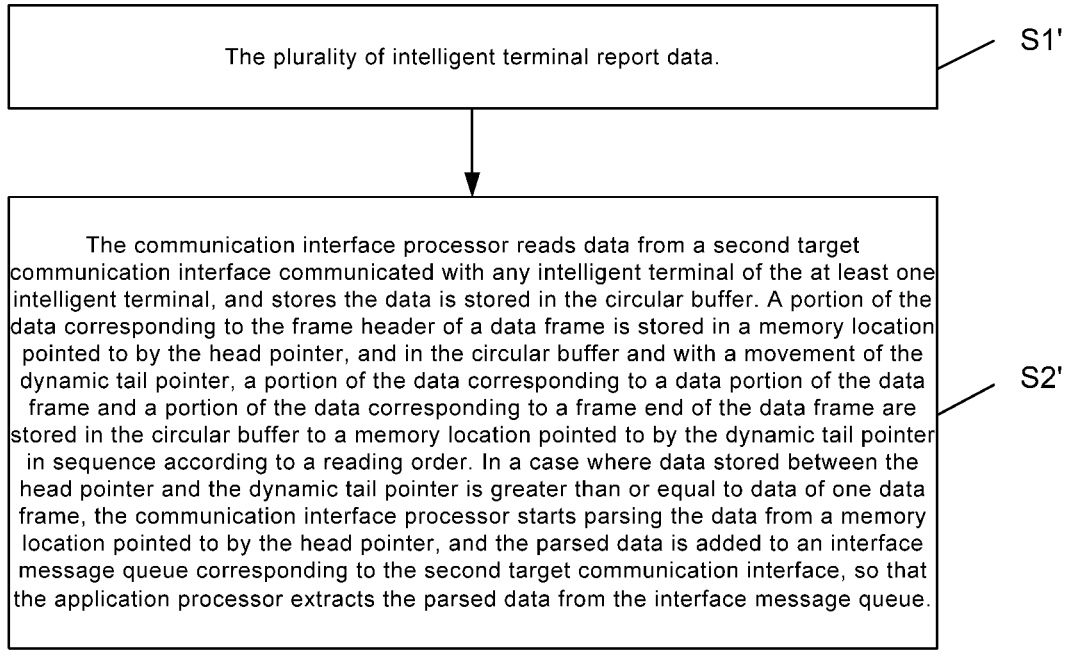
FIG. 7 is a flow diagram of another control method of a home gateway, in accordance with some embodiments.

Based on the home gateway, with reference to FIGS. 1 and 6, some embodiments of the present disclosure provide a control method of the home gateway, and the control method includes S1 to S4. The S1 to S3 are performed by executing the master process 311. The S4 is performed by executing the target child process.

In S1, a cloud control command is received, and a manufacturer code and a communication protocol of a terminal device to be controlled are identified from the cloud control command.

In S2, a target child process is selected from a plurality of child processes 312. The plurality of child processes 312 correspond to a plurality of types of manufacturer information. Each type of manufacturer information corresponds to at least one terminal device 1. Each type of manufacturer information includes at least a manufacturer code. A manufacturer code in manufacturer information corresponding to the target child process is the same as the manufacturer code of the terminal device 1 to be controlled.

For example, one or more terminal devices 1 have a same type of manufacturer information. In some examples, the plurality of types of manufacturer information are different from each other. In some examples, some of plurality of types of manufacturer information is the same.

Different child processes 312 correspond to different types of manufacturer information respectively, which may ensure that each child process 312 corresponds to one type of manufacturer information, and manufacturer information corresponding to any two child processes 312 is different. In addition, each communication message queue 41 corresponds to a child process 312, and thus an independent communication between the child process 312 and the master process 311 may be achieved through the communication message queue 41.

In S3, the cloud control command is written into the communication message queue 41 corresponding to the target child process according to the communication protocol of the terminal device to be controlled.

In S4, the cloud control command is extracted from the communication message queue 41 corresponding to the target child process, the first target communication interface coupled with the terminal device to be controlled is determined according to the cloud control command, and the terminal device to be controlled is controlled through the first target communication interface.

In the control method of the home gateway based on processor, the plurality of child processes 312 respectively correspond to different manufacturer information, and thus each child process 312 may independently control a corresponding terminal device 1. That is, after the manufacturer code and the communication protocol of the terminal device to be controlled is identified from the cloud control command by using the master process 311, by means of selecting the target child process, and writing the cloud control command to the communication message queue 41 corresponding to the target child process according to the communication protocol of the terminal device to be controlled, the cloud control command may be extracted from the corresponding communication message queue 41 by using the target child process, and the terminal device to be controlled is independently controlled according to the cloud control command. Thereby, it is convenient for the home gateway to uniformly control a plurality of terminal devices adopting different communication protocols from different manufacturers, and processing processes of complicated and diverse terminal protocols of the home gateway are simplified.

Therefore, the control method of the home gateway based on processors provided by some embodiments of the present disclosure, may reduce data coupling processes in a process of performing protocol processings on the plurality of different terminal devices 1, improve a scalability of the home gateway, which is advantageous for laterally adding smart home devices in the same smart home environment, and performing a corresponding function development and maintenance of the home gateway in a later period.

In some embodiments, the control method of the home gateway further includes: performing a master process to: obtain the plurality of types of manufacturer information; create the plurality of child processes 312 correspondingly according to types of the plurality of types of manufacturer information, and create a communication message queue 41 for each child process 312.

It will be noted that the above step may be performed only once. That is, the above step will not be performed before the cloud control command is received every time. In addition, the plurality of types of manufacturer information may be obtained by receiving them through the user input.

In some embodiments, among the plurality of types of manufacturer information obtained by using the master process 311, each type of manufacturer information further includes a communication protocol used by a corresponding terminal device 1.

In some embodiments, in the master process 311, creating the plurality of child processes 312 correspondingly according to the plurality of types of manufacturer information, includes: in the master process 311, creating the plurality of child processes 312 according to manufacturer codes of the plurality of types of manufacturer information. In this case, the plurality of child processes 312 are in one-to-one correspondence with the plurality types of manufacturer information.

In some embodiments, in the master process 311, creating the plurality of child processes 312 correspondingly according to the plurality of types of manufacturer information, includes: in the master process 311, creating the plurality of child processes 312 according to manufacturer codes and communication protocols of the plurality of types of manufacturer information. In this case, each child process 312 corresponds to a type of manufacturer code and a type of communication protocol. Manufacturer codes and/or communication protocols of any two child processes 312 are different. That is to say, manufacturer codes of any two child processes 312 are different. Alternatively, communication protocols of any two child processes 312 are different. Alternatively, manufacturer codes of any two child processes 312 are different, and communication protocols of the two child processes 312 are different, so that there are no at least two child processes 312 having a same manufacturer code and a same communication protocol.

In some embodiments, in a case where the plurality of child processes 312 are created by the master process 311 according to the manufacturer codes and the communication protocols of the plurality of types of manufacturer information, the manufacturer code in the manufacturer information corresponding to the target child process selected in S2 is the same as the manufacturer code of the terminal device to be controlled, and a communication protocol in the manufacturer information corresponding to the target child process selected in S2 is the same as the communication protocol of the terminal device to be controlled.

It will be noted that, a data structure of the cloud control command may be set according to actual needs. In some embodiments, the cloud control command has the data structure shown in FIG. 5, that is, the cloud control command includes a device type 601, a device address 602 and command data 603. The device type 601 includes the manufacturer code and the communication protocol of the terminal device to be controlled. The master process 311 may identify the manufacturer code and the communication protocol of the terminal device to be controlled from the device type 601, select the target child process from the plurality of child processes 312 according to the manufacturer code, and write the device address 602 and the command data 603 into a communication message queue 41 corresponding to the target child according to the communication protocol.

In some embodiments, the S4, in which the first target communication interface coupled with the terminal device to be controlled is determined according to the cloud control command, includes: selecting a first target communication interface from the plurality of communication interfaces 2 according to the communication protocol of the terminal device to be controlled included in the cloud control command. One of at least one type of communication protocol corresponding to the first target communication interface is the same as the communication protocol of the terminal device to be controlled. The cloud control command is then sent to the first target communication interface according to the communication protocol of the terminal device to be controlled.

In some embodiments, if there are more than one communication interfaces 2 having a type of communication protocol that is the same as the communication protocol of the terminal device to be controlled, any one of the more than one communication interfaces 2 is selected as the first target communication interface.

For example, in a process of sending the cloud control command to the first target communication interface in the target child process according to the communication protocol of the terminal device to be controlled, an interface message queue 42 corresponding to the first target communication interface is set as a target message queue, and the cloud control command is written into the target message queue according to the communication protocol of the terminal device to be controlled, so as to ensure that the cloud control command may be parsed from the target message queue to the first target communication interface by the communication interface module 32.

The cloud control command includes, for example, at least two types of functional instructions, such as at least two of an add instruction, a delete instruction, and a control instruction. The at least two functional instructions are usually expressed through the command data 603 of the cloud control command. The S4, in which the cloud control command is extracted from the communication message queue 41, includes: decoding the cloud control command, separating the at least two types of functional instructions in the cloud control command to a priority queue according to an order of a priority from high to low, and processing each type of functional instruction according to the priority queue. For example, a priority of the add instruction is higher than a priority of the delete instruction, and the priority of the delete instruction is higher than a priority of the control instruction.

In the control method of the home gateway provided by some embodiments of the present disclosure, the at least two types of functional instructions in the cloud control command are separated to the priority queue according to the order of a priority from high to low by using the target child process, and each type of functional instruction is processed according to the priority queue of the at least two types of functional instructions separated, so as to ensure that the functional instructions in the cloud control command are executed in order, thereby achieving an orderly and reliable control of the plurality of terminal devices 1 by the home gateway.

Based on the home gateway provided by some embodiments above, with reference to FIGS. 1-3 and 7, some embodiments of the present disclosure provide a control method of home gateway based on at least one terminal, and the method includes S1' to S2'.

In S1', a second target communication interface receives data from at least one terminal device 1 coupled with the second target communication interface.

The at least one terminal device 1 may actively report the data according to its actual usage conditions, or report the data according to data requests in the cloud control commands received by it.

In S2', the communication interface module 32 reads data from the second target communication interface, and stores the data in the circular buffer 33. A portion of the data corresponding to the frame header of a data frame is stored in a position, to which the head pointer 331 is pointed, of the circular buffer 33. In addition, with a movement of the dynamic tail pointer 332, a portion of the data corresponding to a data portion of the data frame and a portion of the data corresponding to a frame end of the data frame are stored in a region of the circular buffer 33 in sequence according to a reading order, and the region begins from a location after the location pointed to by the head pointer 331 and ends with a location pointed to by the dynamic tail pointer 332. Once data stored between the head pointer 331 and the dynamic tail pointer 332 is greater than or equal to data of one data frame, the communication interface module 32 starts parsing the data from a location pointed to by the head pointer 331, and the parsed data is added to an interface message queue 42 corresponding to the second target communication interface, so that the application processing module 31 extracts the parsed data from the interface message queue 42.

In some embodiments, a position of the head pointer 331 and a position of the dynamic tail pointer 332 in the circular buffer 33 are updated after the communication interface module 32 described above parses the data stored between the head pointer 331 and the dynamic tail pointer 332, and the communication interface module 32 may continue to parse a next data frame according to the head pointer 331, the position of which is updated.

In the control method of a home gateway based on at least one terminal provided by some embodiments of the present disclosure, a receiving flow and a processing flow of the data received from the at least one terminal device 1 may be separated by setting a circular buffer 33 including the head pointer 331 and the dynamic tail pointer 332 in the communication interface module 32. That is, the data from the at least one terminal device 1 is received in the circular buffer 33 by using the communication interface module 32 at first, and after the data stored between the head pointer 331 and the dynamic tail pointer 332 is greater or equal to the data of one data frame, the communication interface module 32 parses the stored data, and add the parsed data into the interface message queue 42 corresponding to the second target communication interface, thereby ensuring that a read frame of the data received from the at least one terminal device 1 is complete, which is advantageous for improving a reliability of the data processing, thereby avoiding a concurrence of actively reporting data by the terminal devices 1.

It will be added that, in some embodiments described above, a data structure of messages in the interface message queue 42 may be set according to actual needs. For example, the messages in the interface message queue 42 have the data structure as shown in FIG. 4, and the message includes a message type 501, a message length 502 and a message body 503. The message body 503 includes an address, a command and data of the received data. The messages in the interface message queue 42 may be extracted and processed by a corresponding child process 312. The data received from a plurality of terminal devices 1 coupled with a same communication interface 2 and having different types of manufacturer information may be identified and distinguished according to the message type 501.

In order to describe the control method of the home gateway described above more clearly, the following is a detailed description of an application of a home gateway.

Figure 8:
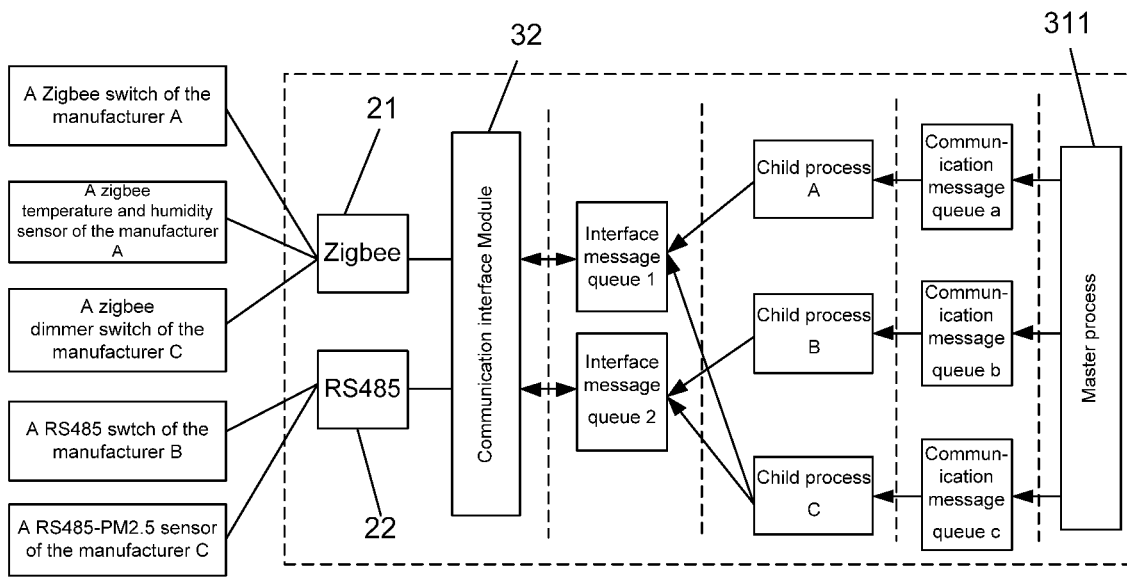
FIG. 8 is a schematic diagram showing a structure of another home gateway, in accordance with some embodiments.

With reference to FIG. 8, five terminal devices that are from three manufacturers A, B and C, are coupled with the home gateway, which are as follows respectively.

A first terminal device, i.e., a Zigbee switch of the manufacturer A, is as follows.

| Manufacturer number | A |
|---|---|
| Type identity (ID) | 01 (switch) |
| Device identity (ID) | 01 |
| Communication mode | Zigbee |
| Protocol number | 0001 |
| Function | Addition |
| | On-off operation |
| | Deletion |
| | Uploading on-off state |

A second terminal device, i.e., a Zigbee temperature and humidity sensor of the manufacturer A, is as follows.

| Manufacturer number | A |
|---|---|
| Type identity (ID) | 02 (temperature and humidity sensor) |
| Device identity (ID) | 02 |
| Communication mode | Zigbee |
| Protocol number | 0001 |
| Function | Addition |
| | Deletion |
| | Uploading temperature and humidity data |

A third terminal device, i.e., a RS485 switch of the manufacturer B, is as follows.

| Manufacturer number | B |
|---|---|
| Type identity (ID) | 01 (switch) |
| Device identity (ID) | 03 |
| Communication mode | RS485 |
| Protocol number | 0002 |
| Function | Addition |
| | Control |
| | Deletion |
| | Uploading states |

A fourth terminal device, i.e., a RS485-PM (particulate matter) 2.5 sensor of the manufacturer C, is as follows.

| Manufacturer number | C |
|---|---|
| Type identity (ID) | 03 (PM2.5 sensor) |
| Device identity (ID) | 04 |
| Communication mode | RS485 |
| Protocol number | 0003 |
| Function | Addition |
| | Deletion |
| | Uploading PM2.5 |

A fifth terminal device, i.e., a Zigbee dimmer switch of the manufacturer C, is as follows.

| Manufacturer number | C |
|---|---|
| Type identity (ID) | 04 (dimmer switch) |
| Device identity (ID) | 05 |
| Communication mode | Zigbee |
| Protocol number | 0004 |
| Function | Addition |
| | Control |
| | Deletion |
| | Uploading states |

The five terminal devices are coupled with two communication interfaces according to their communication modes, and adopt four types of communication protocols in all. The four types of communication protocols are as follows.

A first type of communication protocol, a protocol number of which is 0001, is as follows.

| Protocol number | 0001 |
|---|---|
| Hardware interface | Zigbee |
| Start character (SOF) | Length: 2 bytes |
| | Matching characters: 0x55 0x55 |
| Address (ADDR) | Length: 2 bytes |
| Command (CMD) | Length: 2 bytes |
| Length (LEN) | Length: 1 byte |
| Data (DATA) | Length: LEN |
| Check (CHK) | Check type: none |
| | Length: 0 byte |
| End character (EOF) | Length: 2 bytes |
| | Matching characters: 0xaa 0xaa |

A second type of communication protocol, a protocol number of which is 0002, is as follows.

| Prototol number | 0002 |
|---|---|
| Hardware interface | RS485 |
| Start character (SOF) | Length: 2 bytes |
| | Matching characters: 0x68 0x00 |
| Address (ADDR) | Length: 8 bytes |
| Command (CMD) | Length: 1 byte |
| Length (LEN) | Length: 1 byte |
| Data (DATA) | Length: LEN |
| Check (CHK) | Check type: CRC |
| | Length: 1 byte |
| End character (EOF) | Length: 1 byte |
| | Matching characters: 0x16 |

A third type of communication protocol, a protocol number of which is 0003, is as follows

| Protocol number | 0003 |
|---|---|
| Hardware interface | RS485 |
| Start character (SOF) | Length: 1 byte |
| | Matching characters: 0x68 |
| Address (ADDR) | Length: 7 bytes |
| Command (CMD) | Length: 1 byte |
| Length (LEN) | Length: 2 bytes |
| Data (DATA) | Length: LEN |
| Check (CHK) | Check type: CRC |
| | Length: 1 byte |
| End character (EOF) | Length: 1 byte |
| | Matching characters: 0x16 |

A fourth type of communication protocol, a protocol number of which is 0004, is as follows.

| Protocol number | 0004 |
|---|---|
| Hardware interface | Zigbee |
| Start character (SOF) | Length: 2 bytes |
| | Matching characters: 0x55 0xaa |
| Address (ADDR) | Length: 7 bytes |
| Command (CMD) | Length: 1 byte |
| Length (LEN) | Length: 2 bytes |
| Data (DATA) | Length: LEN |
| Check (CHK) | Check type: CRC |
| | Length: 1 byte |
| End character (EOF) | Length: 1 byte |
| | Matching characters: 0x16 |

The control method of a home gateway provided by some embodiments of the present disclosure is implemented as follows.

In the master process 311, three child processes 312 are created according to three manufacturer codes of the five terminal devices, and the three child processes 312 are marked as a child process A, a child process B and a child process C, so that data of the terminal devices of the manufacturer A is processed by using the child process A, data of the terminal device of the manufacturer B is processed by using the child process B, and data of the terminal devices of the manufacturer C is processed by using the child process C. For example, the child process A is configured to monitor messages in an interface message queue 1 that are messages of the manufacturer A, the child process B is configured to monitor messages in an interface message queue 2 that are messages of the manufacturer B, and the child process C is configured to monitor messages in the interface message queue 1 and the interface message queue 2 that are messages of the manufacturer C.

In the master process 311, a communication message queue a, a communication message queue b and a communication message queue c are created according to the child process A, the child process B and the child process C, respectively, so as to achieve independent communications between the master process 311 and the child process A, the child process B, and the child process C.

In the master process 311, a protocol configuration file is created according to the two communication interfaces corresponding to the five terminal devices and the communication protocols in corresponding manufacturer information. The communication interface module 32 creates two interface message queues according to the protocol configuration file, and the two interface message queues are marked as an interface message queue 1 and an interface message queue 2. The interface message queue 1 is configured to process data of a Zigbee interface 21, and the interface message queue 2 is configured to process data of a RS485 interface 22.

Assuming that the child process C is monitoring the messages in the interface message queue 1 and the interface message queue 2 that are messages of the manufacturer C at present, that is, assuming that the child process C is monitoring the terminal devices of the manufacturer C, if the RS485-PM2.5 sensor of the manufacturer C reports data through the RS485 interface, the communication interface module 32 parses the received data according to the corresponding communication protocol, and the data reported by the RS485-PM2.5 sensor may be written into the corresponding interface message queue 2 in a form of the following data structure.

| Message type (mtype) | Message text (mtext) | | | |
|---|---|---|---|---|
| C | Address | Command | Length | Data |

Since communication protocols numbered 0002 and 0003 both correspond to the RS485 interface, in a process of parsing the data reported by the RS485-PM2.5 sensor of the manufacturer C by the communication interface nodule 32 according to the corresponding communication protocols, in a general way, the communication interface module 32 may simultaneously parse the received data according to the two communication protocols numbered 0002 and 0003. However, since there is a difference between the communication protocol numbered 0002 and the communication protocol numbered 0003, the data reported by the RS485-PM2.5 sensor of the manufacturer C may only be parsed and identified by the communication protocol numbered 0003, but may not be parsed and identified by the communication protocol numbered 0002.

Once the child process C monitors the messages that are messages of the manufacturer C in the interface message queue 2, the child process C extracts the messages, i.e., the data reported by the RS485-PM2.5 sensor of the manufacturer C from the interface message queue 2, and written it to the corresponding communication message queue c in a form of the following data structure.

| Message type (mtype) | Type identity (ID) | 03 (PM 2.5 sensor) |
|---|---|---|
| Message data | Device identity (ID) | 04 |
| | PM2.5 | Value of PM2.5 |

After receiving the messages in the communication message queue c, the master process 311 will know that the received messages are the data reported by the RS485-PM2.5 sensor of the manufacturer C, i.e., the value of PM2.5, according to the type ID indicated in the message type. The master process 311 may upload the data to a cloud server through a Java Script Object Notation (JSON) or other related data exchange formats after extracting the data.

It will be understood that, the control method described in some embodiments of the present disclosure may be implemented by means of executing software instructions. The software instructions may be composed of corresponding software modules, which may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disk read only memory (CD-ROM) or any other form of a storage medium known in the art.

Some embodiments of the present disclosure provide a non-transitory computer-readable storage medium storing executable instructions that, when executed by a home gateway, cause the gateway to perform the control method of the home gateway provided by some embodiments described above.

Some embodiments of the present disclosure provide a computer product, which includes a processor, a memory, and computer programs that are stored in the memory and operable on the processor. The computer product executes the control method of a home gateway when the computer programs are performed by the processor.

The non-transitory computer-readable storage medium and the computer product are configured to perform the control method of a home gateway provided by some embodiments described above, beneficial effects that may be achieved may refer to beneficial effects of corresponding methods provided by some embodiments described above, and details are not described herein again. A person skilled in the art will appreciate that in one or more of the embodiments described above, the functions described in the present disclosure may be implemented by using a hardware, a software, a firmware or any combination thereof. When implemented by using the software, the functions may be stored in a computer readable medium or transmitted as one or more instructions or codes on the computer readable medium. The computer readable medium includes a computer storage medium and a communication medium. The communication medium includes any medium that facilitates a transfer of a computer program from one location to another, and the storage medium may be any available medium that may be accessed by a general-purpose computer or a special-purpose computer.

The foregoing descriptions are merely specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A control method of a home gateway, the control method comprising:
executing a master process to:
receive a cloud control command, and identify a manufacturer code and a communication protocol of an terminal device to be controlled from the cloud control command;
select a target child process from a plurality of child processes, wherein the plurality of child processes corresponds to a plurality of types of manufacturer information, each type of manufacturer information corresponds to at least one terminal device and includes at least a manufacturer code, each child process corresponds to a communication message queue, and a manufacturer code in manufacturer information corresponding to the target child process is the same as the manufacturer code of the terminal device to be controlled; and
write the cloud control command into a communication message queue corresponding to the target child process according to the communication protocol of the terminal device to be controlled; and
executing the target child process to:
extract the cloud control command from the communication message queue corresponding to the target child process, determine a first target communication interface coupled with the terminal device to be controlled according to the cloud control command, and control the terminal device to be controlled through the first target communication interface.

2. The control method according to claim 1, wherein before receiving a cloud control command, the control method further comprises:
executing the master process to:
obtain the plurality of types of manufacturer information;
create the plurality of child processes correspondingly according to the plurality of types of manufacturer information, and create a communication message queue for each child process.

3. The control method according to claim 2, wherein creating the plurality of child processes includes: creating the plurality of child processes according to manufacturer codes of the plurality of types of manufacturer information, wherein the plurality of child processes are in one-to-one correspondence with the plurality of types of manufacturer information; or
wherein each type of manufacturer information further includes a communication protocol, and creating the plurality of child processes includes: creating the plurality of child processes according to the manufacturer codes and communication protocols of the plurality of types of manufacturer information, wherein each child process corresponds to a manufacturer code and a communication protocol, and manufacturer codes of any two child processes are different, or communication protocols of any two child processes are different, or manufacturer codes of any two child processes are different and communication protocols of the two child processes are different.

4. The control method according to claim 3, wherein in a case where the plurality of child processes are created according to the manufacturer codes and communication protocols of the plurality of types of manufacturer information, a communication protocol corresponding to the target child process is the same as the communication protocol of the terminal device to be controlled.

5. The control method according to claim 1, wherein each communication interface is capable of being coupled with at least one terminal device, and each communication interface corresponds to at least one type of communication protocol;
determining the first target communication interface coupled with the terminal device to be controlled according to the cloud control command, includes:
selecting the first target communication interface from a plurality of communication interfaces, according to the communication protocol of the terminal device to be controlled included in the cloud controlling command, wherein one of at least one type of communication protocol corresponding to the first target communication interface is the same as the communication protocol of the terminal device to be controlled; and
sending the cloud control command to the first target communication interface according to the communication protocol of the terminal device to be controlled.

6. The control method according to claim 5, wherein each type of manufacturer information further includes a communication protocol, the control method further comprises:
executing the master process, to:
create a protocol configuration file according to the plurality of communication interfaces and communication protocols in the plurality of types of manufacturer information; and
create a plurality of interface message queues corresponding to the plurality of communication interfaces according to the protocol configuration file, and
sending the cloud control command to the first target communication interface according to the communication protocol of the terminal device to be controlled, includes:
setting an interface message queue corresponding to the first target communication interface as a target message queue, and writing the cloud control command into the target message queue according to the communication protocol of the terminal device to be controlled; and
parsing the cloud control command from the target message queue to the first target communication interface.

7. The control method according to claim 1, wherein the cloud control command includes at least two types of functional instructions; and
extracting the cloud control command from the communication message queue, includes:
decoding the cloud control command, separating the at least two types of functional instructions in the cloud control command to a priority queue according to an order of a priority from high to low, and processing each type of functional instruction according to the priority queue.

8. The control method according to claim 7, wherein
each type of functional instruction includes an add instruction, a delete instruction, or a control instruction; and a priority of the add instruction is higher than a priority of the delete instruction, and the priority of the delete instruction is higher than a priority of the control instruction.

9. A control method of a home gateway, wherein in the home gateway, each of a plurality of communication interfaces is capable of being coupled with at least one terminal device, and each communication interface corresponds to one interface message queue; and the plurality of communication interfaces are all coupled with at least one processor, the at least one processor includes a circular buffer, the circular buffer includes a head pointer corresponding to a frame header of a data frame and a dynamic tail pointer corresponding to the head pointer, and a storage length of the circular buffer is greater than a maximum storage length allowed to be stored between the head pointer and the dynamic tail pointer;

the control method of the home gateway, comprises:

receiving, by a second target communication interface, data from at least one terminal device coupled with the second target communication interface;

reading, by the at least one processor, the data from the second target communication interface, storing, by the at least one processor, the data in the circular buffer, wherein a portion of the data corresponding to a frame header of a data frame is stored in a position of the circular buffer pointed to by the head pointer, and with a movement of the dynamic tail pointer, a portion of the data corresponding to a data portion of the data frame and a portion of the data corresponding to a frame end of the data frame are stored in a position of the circular buffer pointed to by the dynamic tail pointer in sequence according to a reading order; and once data stored between the head pointer and the dynamic tail pointer is greater than or equal to data of one data frame, parsing, by the at least one processor, the data from the location pointed to by the head pointer, and the parsed data is added into an interface message queue corresponding to the second target communication interface, so that the at least one processor extracts the parsed data from the interface message queue.

10. The control method according to claim 9, further comprising:

updating, by the at least one processor, a position of the head pointer and a position of the dynamic tail pointer in the circular buffer after the at least one processor parses the data stored between the head pointer and the dynamic tail pointer, and parsing, by the at least one processor, a next data frame according to the head pointer, the position of which is updated.

11. A home gateway, comprising:

a plurality of communication interfaces, wherein each communication interface is configured to be coupled with at least one terminal device; and at least one processor coupled with the plurality of communication interfaces, wherein the at least one processor is configured to:

receive a cloud control command, and identify a manufacturer code and a communication protocol of a terminal device to be controlled from the cloud control command;

select a target child process from the plurality of child processes, wherein the plurality of child processes corresponds to a plurality of types of manufacturer information, each type of manufacturer information corresponds to at least one terminal device and includes at least a manufacturer code, each child process corresponding to a communication message queue, and a manufacturer code in manufacturer information corresponding to the target child process is the same as the manufacturer code of the terminal device to be controlled;

write the cloud control command to a communication message queue corresponding to the target child process according to the communication protocol of the terminal device to be controlled; and extract the cloud control command from the communication message queue; determine a first target communication interface coupled with the terminal device to be controlled according to the cloud control command; and control the terminal device to be controlled through the first target communication interface.

12. The home gateway according to claim 11, wherein the at least one processor is further configured to:

obtain the plurality of types of manufacturer information;

create the plurality of child processes correspondingly according to the plurality of types of manufacturer information; and create a communication message queue for each child process.

13. The home gateway according to claim 12, wherein each communication interface corresponds to at least one type of communication protocol, and each type of manufacturer information further includes a communication protocol;

the at least one processor is further configured to:

create a protocol configuration file according to the plurality of communication interfaces and communication protocols in the plurality of types of manufacturer information;

create a plurality of interface message queues corresponding to the plurality of communication interfaces according to the protocol configuration file; and determine the first target communication interface, and transmit the cloud control command to the first target communication interface.

14. The home gateway according to claim 13, further comprising a memory, wherein the memory is coupled with the at least one processor, and the memory is configured to store a plurality of communication message queues and the plurality of interface message queues.

15. The home gateway according to claim 13, wherein the at least one processor includes a circular buffer, the circular buffer includes a head pointer corresponding to a frame header of a data frame and a dynamic tail pointer corresponding to the head pointer, and a storage length of the circular buffer is greater than a maximum storage length allowed to be stored between the head pointer and the dynamic tail pointer;

the at least one processor is further configured to read data from a second target communication interface, and store the data in the circular buffer, wherein the second target communication interface is a communication interface coupled with any terminal device that reports the data, a portion of the data corresponding to the frame header of a data frame is stored in a position of the circular buffer pointed to by the head pointer, and with a movement of the dynamic tail pointer, a portion of the data corresponding to a data portion of the data frame and a portion of the data corresponding to a frame end of the data frame are stored to a position of the circular buffer pointed to by the dynamic tail pointer in sequence, according to a reading order; and the at least one processor is further configured to: once data stored between the head pointer and the dynamic tail pointer is greater than or equal to data of one data frame, start parsing the data from the position of the circular buffer pointed to by the head pointer, and add the parsed data into an interface message queue corresponding to the second target communication interface, so that the at least one processor extracts the parsed data from the interface message queue.

16. A non-transitory computer-readable storage medium storing executable instructions that, when executed by a home gateway, cause the home gateway to perform the control method of the home gateway according to claim 1.

* * * * *